United States Patent
Pan et al.

(10) Patent No.: US 12,365,294 B2
(45) Date of Patent: *Jul. 22, 2025

(54) LUMINOUS LOGO AND MANUFACTURING METHOD THEREFORE

(71) Applicant: ZF ASIA PACIFIC AUTOMOTIVE SAFETY SYSTEMS (SHANGHAI) CO., LTD., Shanghai (CN)

(72) Inventors: Yunfeng Pan, Shanghai (CN); Bingnan Feng, Shanghai (CN); Yidong Han, Shanghai (CN)

(73) Assignee: ZF ASIA PACIFIC AUTOMOTIVE SAFETY SYSTEMS (SHANGHAI) CO., LTD., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/254,887

(22) PCT Filed: Oct. 11, 2021

(86) PCT No.: PCT/IB2021/059277
§ 371 (c)(1),
(2) Date: May 30, 2023

(87) PCT Pub. No.: WO2022/118103
PCT Pub. Date: Jun. 9, 2022

(65) Prior Publication Data
US 2024/0042947 A1 Feb. 8, 2024

(30) Foreign Application Priority Data
Dec. 1, 2020 (CN) .......................... 202011382462.6

(51) Int. Cl.
*B29C 70/70* (2006.01)
*B29C 45/14* (2006.01)
(Continued)

(52) U.S. Cl.
CPC ...... *B60R 13/005* (2013.01); *B29C 45/14549* (2013.01); *B29C 45/14639* (2013.01);
(Continued)

(58) Field of Classification Search
CPC ........ B29C 45/14549; B29C 45/14639; B29C 45/14819; B29C 70/70; B60Q 3/283;
(Continued)

(56) References Cited

U.S. PATENT DOCUMENTS

2007/0160334 A1   7/2007  Cobb et al.
2017/0369022 A1*  12/2017 Kanto .................. B60R 21/215

FOREIGN PATENT DOCUMENTS

EP    1091865 B1    5/2002
FR    3089848 A1 *  6/2020   ....... B29C 45/14549

OTHER PUBLICATIONS

Translation of FR 3089848 A1 (published on Jun. 19, 2020).*
(Continued)

*Primary Examiner* — Leo B Tentoni
(74) *Attorney, Agent, or Firm* — Tarolli, Sundheim, Covell & Tummino LLP (57) ABSTRACT

The present invention relates to the technical field of automobile logos, and provides a luminous logo and a manufacturing method therefor. The luminous logo comprises: a logo body, which is provided with a plurality of protruding portions; a plurality of optical fibre bundles arranged to form an optical fibre structure matching the logo body in shape, the optical fibre structure being evenly overmoulded inside the logo body, and an end of each optical fibre bundle extending from one of the protruding portions; and a light-emitting light source detachable relative to the logo body, the extended ends of the plurality of optical fibre bundles being gathered and connected to the light-emitting light source. According to the present invention, optical fibres are
(Continued)

embedded into a logo body, an end of each optical fibre extends from a respective protruding portion of the logo body and is connected to a detachable light source, thereby realizing luminescence of the logo and facilitating assembly of the logo.

4 Claims, 6 Drawing Sheets

(51) Int. Cl.
    *B60Q 3/283*     (2017.01)
    *B60R 13/00*     (2006.01)
    *B60R 21/215*     (2011.01)
    *G02B 6/06*     (2006.01)
    *G09F 9/305*     (2006.01)
    *G09F 21/04*     (2006.01)

(52) U.S. Cl.
    CPC ...... *B29C 45/14819* (2013.01); *B60R 21/215* (2013.01); *G09F 21/049* (2020.05); *B60R 2021/21543* (2013.01)

(58) Field of Classification Search
    CPC ........ B60R 13/005; B60R 2021/21543; G02B 6/06; G09F 9/305; G09F 21/049
    USPC ....... 264/275, 279, 279.1; 29/527.1; 40/591, 40/593
    See application file for complete search history.

(56) References Cited

OTHER PUBLICATIONS

PCT International Search Report for corresponding International Application Serial No. PCT/IB2021/059277, mailed Jan. 24, 2022, pp. 1-2.

* cited by examiner

LUMINOUS LOGO AND MANUFACTURING METHOD THEREFORE

RELATED APPLICATIONS

This application is a U.S. National Stage Application filed under 35 USC 371, claiming priority to Serial No. PCT/IB2021/059277, filed on 11 Oct. 2021; which claims priority from Chinese Patent Application 202011382462.6, filed 1 Dec. 2020, the entireties of which are hereby incorporated herein by reference.

TECHNICAL FIELD

The present invention relates to the technical field of automobile logos, and in particular to a luminous logo and a manufacturing method therefore.

BACKGROUND ART

With luminous designs, automobile logos often have functions of decoration, warning, etc. In the current automobile logo luminescence modes, backlight light sources are mainly used to realize luminescence of the automobile logos; or light sources are arranged on the side of the automobile logos, and light is transferred to surfaces of the automobile logos by means of reflection; or light conducting apparatuses are used for some luminous automobile logos, and light rays from light sources arranged at other positions are conducted to the vicinity of the automobile logos.

In the prior art, such luminous automobile logos all essentially belong to a backlight binding mode, in which an automobile logo is bound with a light source (a circuit system with a light-emitting diode), and a hole matching the luminous automobile logo needs to be provided in an automobile component during assembly in order to realize the installation of the luminous automobile logo.

However, the luminous automobile logos using the backlight binding mode cannot give a good balance between a luminous function and the assembly stability.

Specifically, if a luminous automobile logo, which is formed by means of backlight binding, is assembled to an automobile component, such as an airbag cover of a driver airbag module on a steering wheel, it is necessary to provide a hole in a logo position of the airbag cover according to an outer contour of the luminous automobile logo, and cause the luminous automobile logo to pass through the airbag cover from the back thereof for installation.

In this way, the strength of the airbag cover will be influenced due to the provision of the hole, which will lead to the failure to fix the luminous automobile logo well when an airbag is exploded. If the luminous automobile logo is assembled from the front of the airbag cover, the luminous automobile logo in the backlight binding mode is too heavy, resulting in great risks when the airbag is inflated.

It should be noted that information disclosed in the above background art section is only used to enhance the understanding of the background of the present invention, and therefore may include information that does not constitute the prior art known to those of ordinary skill in the art.

SUMMARY OF THE INVENTION

In view of this, the present invention provides a luminous logo and a manufacturing method therefore, wherein optical fibres are embedded into a logo body, an end of each optical fibre extends from a respective protruding portion of the logo body and is connected to a detachable light source, thereby realizing luminescence of the logo and facilitating assembly of the logo.

One aspect of the present invention provides a luminous logo, comprising: a logo body, which is provided with a plurality of protruding portions; a plurality of optical fibre bundles arranged to form an optical fibre structure matching the logo body in shape, the optical fibre structure being evenly overmoulded inside the logo body, and an end of each optical fibre bundle extending from one of the protruding portions; and a light-emitting light source detachable relative to the logo body, the extended ends of the plurality of optical fibre bundles being gathered and connected to the light-emitting light source.

In some embodiments, the luminous logo is applied to an airbag cover; and the airbag cover is provided with through holes allowing the protruding portions to be assembled, the logo body is assembled to an outer surface of the airbag cover, and the protruding portions are inserted into the through holes. The airbag cover may be, for example, an airbag cover of a driver airbag module on a steering wheel.

In some embodiments, a mounting plate is provided on an inner side of the airbag cover; and the mounting plate is provided with fixing holes corresponding to the through holes, and the protruding portions are inserted into the through holes and then fixed to the fixing holes.

In some embodiments, the light-emitting light source is assembled on the mounting plate, and the extended ends of the plurality of optical fibre bundles are gathered together and connected to the light-emitting light source; or the light-emitting light source is assembled to an inner surface of the airbag cover, and the extended ends of the plurality of optical fibre bundles are bundled together and connected to the light-emitting light source; or the light-emitting light source is assembled outside the airbag cover, and the extended ends of the plurality of optical fibre bundles are bundled together and connected to the light-emitting light source by means of a main light-conducting optical fibre.

In some embodiments, the protruding portions are fixing pins provided at the bottom of the logo body.

In some embodiments, the optical fibre bundles are side-emitting optical fibre bundles.

In some embodiments, the logo body is formed by means of injection moulding of an injection moulding plastic material doped with scattering particles; and the scattering particles include aluminium oxide particles.

In some embodiments, an outer surface of the logo body is coated with a light-transmissible surface coating by means of physical vapor deposition and/or screen printing; and/or the bottom of the logo body is polished and coated with a reflective coating.

Another aspect of the present invention provides a manufacturing method for a luminous logo, the manufacturing method comprising: bundling optical fibres to form a plurality of optical fibre bundles according to the shape of the logo, and arranging the plurality of optical fibre bundles to form an optical fibre structure matching the logo in shape; fixing the optical fibre structure into an injection mould; and forming a logo body in the injection mould by means of injection moulding, wherein the optical fibre structure is evenly overmoulded inside the logo body, the logo body forms a plurality of protruding portions, and an end of each optical fibre bundle extends from one of the protruding portions.

In some embodiments, after the logo body is formed, the manufacturing method further comprises: forming an airbag cover provided with through holes allowing the protruding portions to be assembled; and assembling the logo body from an outer surface of the airbag cover such that the logo body is fixed to the outer surface of the airbag cover, and the protruding portions are inserted into the through holes.

In some embodiments, when the logo body is assembled, the manufacturing method further comprises: providing a mounting plate on an inner side of the airbag cover, wherein the mounting plate matches the logo body in shape, and the mounting plate is provided with fixing holes corresponding to the through holes; and inserting the protruding portions into the through holes and the fixing holes, then fixing the protruding portions to the mounting plate.

In some embodiments, when the logo body is assembled, the manufacturing method further comprises: assembling a light-emitting light source on the mounting plate, and gathering the extended ends of the plurality of optical fibre bundles together and connecting same to the light-emitting light source; or assembling a light-emitting light source to an inner surface of the airbag cover, and gathering the extended ends of the plurality of optical fibre bundles together and connecting same to the light-emitting light source; or assembling a light-emitting light source outside the airbag cover, and gathering the extended ends of the optical fibre bundles together and connecting same to the light-emitting light source by means of a main light-conducting optical fibre.

Compared with the prior art, the present invention at least has the beneficial effects as follows:

The plurality of optical fibre bundles is arranged to form the optical fibre structure matching the logo body in shape, which is evenly overmoulded inside the logo body, so that optical fibres are embedded into the logo body; the ends of the optical fibres extend from the protruding portions of the logo body, and are gathered and connected to the detachable light-emitting light source to realize uniform luminescence of the logo body;

the detachable design of the light-emitting light source relative to the logo body facilitates the assembly of the luminous logo; when the luminous logo is applied to an automobile component including but not limited to an airbag cover, the logo body and the light-emitting light source may be assembled separately, so that the automobile component does not need to be provided with a large hole matching an outer contour of the luminous logo, thereby ensuring the strength of the automobile component and the assembly stability of the luminous logo; and therefore, the present invention can ensure the assembly stability of the luminous logo while realizing the luminescence of the logo.

It should be understood that the above general description and the following detailed description are only exemplary and explanatory and cannot limit the present invention.

BRIEF DESCRIPTION OF THE DRAWINGS

The drawings herein, which are incorporated into and constitute a part of the description, illustrate embodiments consistent with the present invention and, together with the description, are used to explain principles of the present invention. Obviously, the drawings described below show merely some of the embodiments of the present invention, and those of ordinary skill in the art would also have obtained other drawings according to these drawings without involving any inventive effort.

DETAILED DESCRIPTION OF EMBODIMENTS

Now exemplary embodiments will be described more fully with reference to the drawings. However, the exemplary embodiments can be implemented in many forms and should not be construed as limited to the embodiments set forth herein. On the contrary, these embodiments are provided to make the present invention thorough and complete, and to fully convey the concept of the exemplary embodiments to those skilled in the art.

In addition, the drawings are only schematic illustrations of the present invention and are not necessarily drawn to scale. In the drawings, the same reference numerals denote the same or similar parts, and thus the repeated description thereof will be omitted. Some block diagrams shown in the drawings are functional entities, which do not necessarily correspond to physically or logically independent entities.

The sequence numbers of steps in the method embodiment are only used to represent different execution contents, and do not strictly limit the execution order of the steps. It has to be noted that the embodiments in the present invention and features of the various embodiments can be combined with each other without conflict.

Figure 1:
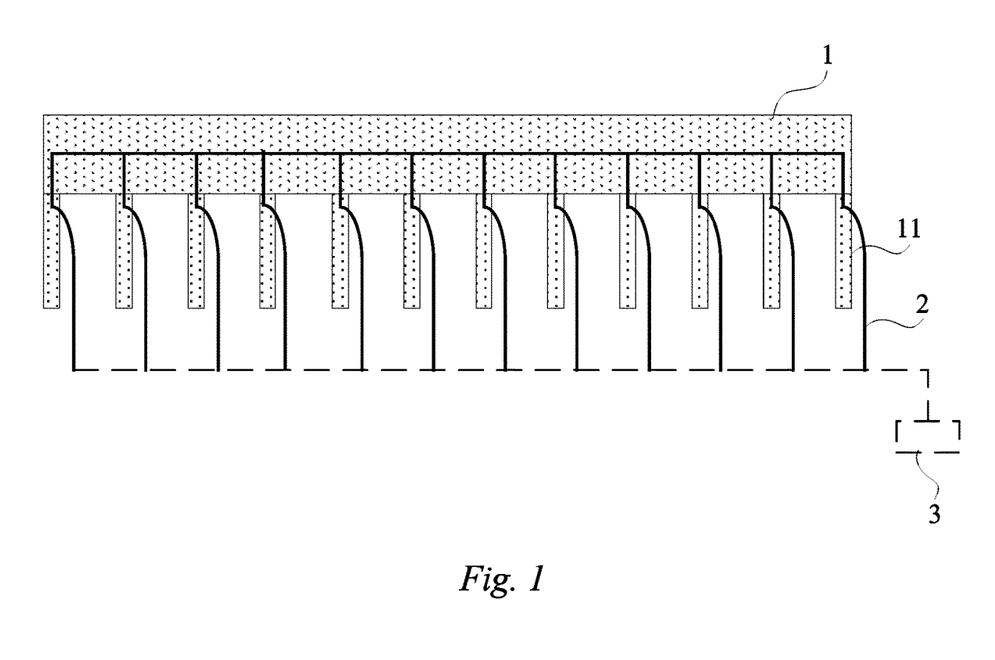
FIG. 1 is a side-view structural schematic diagram of a luminous logo in an embodiment of the present invention.
Figure 2:
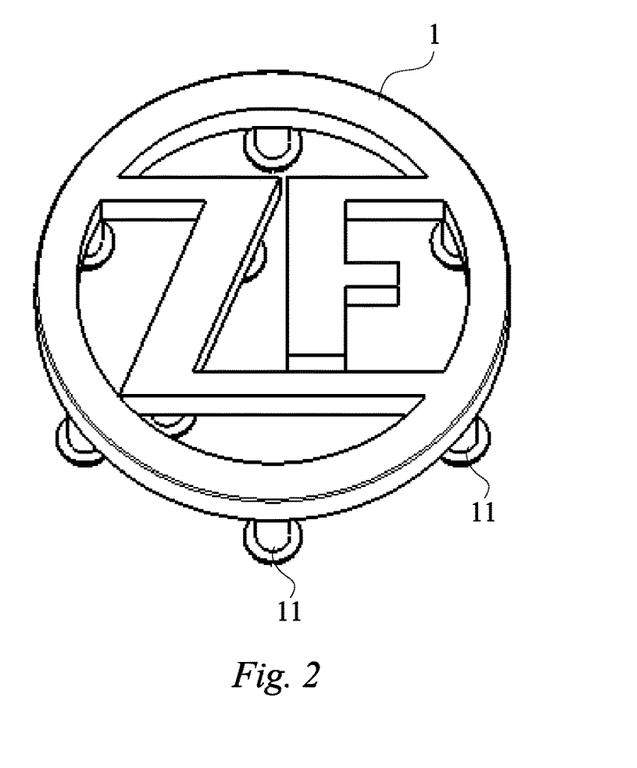
FIG. 2 is a structural schematic diagram of a logo body in the embodiment of the present invention.
Figure 3:
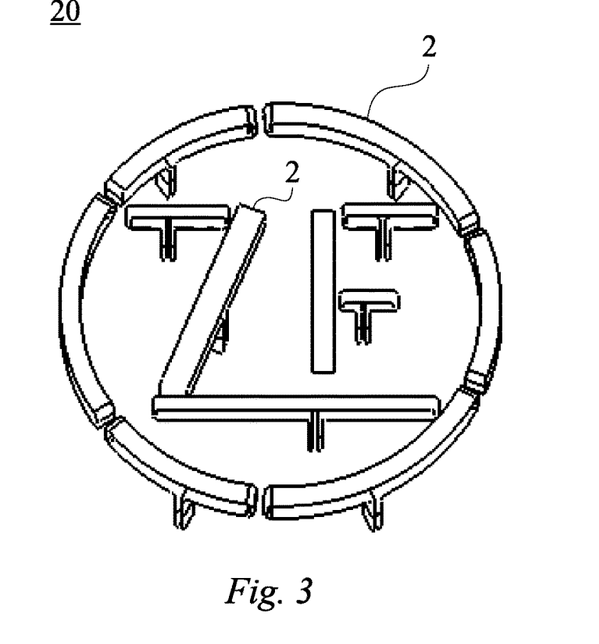
FIG. 3 is a structural schematic diagram of an optical fibre structure in the embodiment of the present invention.
Figure 4:
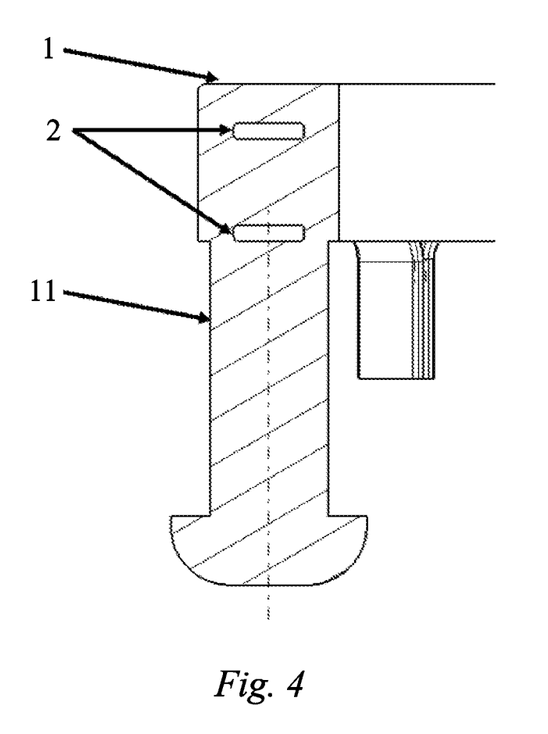
FIG. 4 is a cross-sectional structural schematic diagram of the luminous logo in the embodiment of the present invention.

FIG. 1 shows a side-view structure of a luminous logo in an embodiment, FIG. 2 shows a structure of a logo body, FIG. 3 shows a structure of an optical fibre structure, and FIG. 4 shows a cross-sectional structure of the luminous logo. As shown in FIGS. 1-4, the luminous logo in this embodiment comprises: a logo body 1, the logo body 1 being provided with a plurality of protruding portions 11; a plurality of optical fibre bundles 2 arranged to form an optical fibre structure 20 matching the logo body 1 in shape, the optical fibre structure 20 being evenly overmoulded inside the logo body 1, and an end of each optical fibre bundle 2 extending from one of the protruding portions 11; and a light-emitting light source 3 detachable relative to the logo body 1, the extended ends of the plurality of optical fibre bundles 2 being gathered and connected to the light-emitting light source 3.

In the luminous logo of the above embodiment, the plurality of optical fibre bundles 2 are arranged to form the optical fibre structure 20 matching the logo body 1 in shape, such that the optical fibre structure 20 is evenly overmoulded inside the logo body 1, and optical fibres are embedded into the logo body. The ends of the optical fibre bundles 2 extend from the protruding portions 11 of the logo body 1 and are gathered and connected to the detachable light-emitting light source 3 to realize uniform luminescence of the logo body 1. Further, the detachable design of the light-emitting light source 3 relative to the logo body 1 can facilitate the assembly of the luminous logo; when the luminous logo is applied to an automobile component including but not limited to an airbag cover, the logo body 1 and the light-emitting light source 3 may be assembled separately, so that the automobile component does not need to be provided with a large hole matching an outer contour of the luminous logo, thereby ensuring the strength of the automobile component and the assembly stability of the luminous logo; and therefore, by means of the structural design of the luminous logo of the above embodiment, the assembly stability of the luminous logo can be ensured while the luminescence of the logo is realized.

The logo body 1 in the above embodiment may be designed into different shapes according to the requirement of an automobile model. For example, the logo body 1 may be designed in an annular shape, an oval shape, a square shape, etc. Especially for the logo body 1 composed of thin lines, by means of the design of embedding the optical fibre bundles 2 and detachably connecting same to the light-emitting light source 3, both the luminous function and the assembly stability could be guaranteed.

In one specific example, a specific structure of the logo body 1 is as shown in FIG. 2, which has an annular outer contour. Different pattern shapes may be designed in the annular outer contour according to needs, for example, as shown in FIG. 2, letters "ZF" are provided in the annular outer contour. In other examples, other shapes, letters, numbers, Chinese characters, etc. may be provided. The plurality of protruding portions 11 are arranged at the bottom of the annular outer contour for allowing the optical fibre bundles 2 to be led out and to assemble the luminous logo to the automobile component. In this example, the protruding portions 11 are specifically fixing pins provided at the bottom of the logo body 1. In other examples, the protruding portions 11 may be designed in other structures as long as they can lead out the optical fibre bundles 2 and assemble the luminous logo.

The logo body 1 is formed by means of injection moulding of an injection moulding plastic material doped with scattering particles, so as to realize a uniform luminescence effect. The scattering particles include but are not limited to aluminium oxide particles. An outer surface of the logo body 1 may be further subjected to surface treatment by means of physical vapor deposition (PVD), etc., so as to form metal texture. If it is necessary to provide a matching colour, pigment or lacquer may be applied to the outer surface of the logo body 1 by means of screen printing, etc., as long as the thickness of a coating/plating layer can ensure the light transmission ability. Further, the bottom of the logo body 1 may be polished and coated with a reflective layer, so that light originally emitted to the bottom of the logo is reflected upwards, and the utilization rate of the light is increased.

Regarding the structure of the logo body 1, the optical fibre structure 20, as shown in FIG. 3, is formed by arranging the plurality of optical fibre bundles 2 according to the structure of the logo. Each optical fibre bundle 2 may be formed by bundling ultra-fine side-emitting optical fibres. According to the structure of the logo body 1, different numbers of ultra-fine side-emitting optical fibres may be bundled into optical fibre bundles 2 with different dimensions to form the optical fibre structure 20 completely matching the logo body 1 in shape.

As shown in FIGS. 1-4, regarding the logo body 1 with the letters "ZF" arranged in the annular outer contour, a plurality of optical fibre bundles 2 each may be enclosed in an annular shape with the same dimensions, and embedded in the annular outer contour of the logo body 1, and two ends of each optical fibre bundle 2 extend from the root of one of the protruding portions 11. Further, regarding the letter "Z", three optical fibre bundles 2 may be provided, wherein the first optical fibre bundle 2 enters from the bottom of one end of an upper line of the letter "Z" and extends out from the bottom of the other end thereof; the second optical fibre bundle 2 enters from the bottom of an upper end of an inclined line of the letter "Z" and extends out from the bottom of a lower end of the inclined line; and the third optical fibre bundle 2 enters from the bottom of one end of a lower line of the letter "Z" and extends out from the bottom of the other end thereof. The two extended ends of all the optical fibre bundles 2 may be connected to the same light-emitting light source 3, so that the whole logo with the optical fibres embedded therein can be illuminated by one light-emitting light source 3. The light-emitting light source 3 includes but is not limited to a light-emitting apparatus such as an LED bead.

A specific way of embedding the optical fibres into the logo body is to fix the optical fibre structure 20 into an injection mould after the optical fibre structure 20 is formed, and then perform in-mould injection moulding in the injection mould, for example, use the injection moulding plastic material mixed with the scattering particles to perform injection moulding, so as to evenly overmould the optical fibre inside the logo body.

The luminous logo of the present invention may be applied to any automobile component, and the following description will take the luminous logo applied to the airbag cover as an example, but the present invention is not limited thereto.

Figure 5:
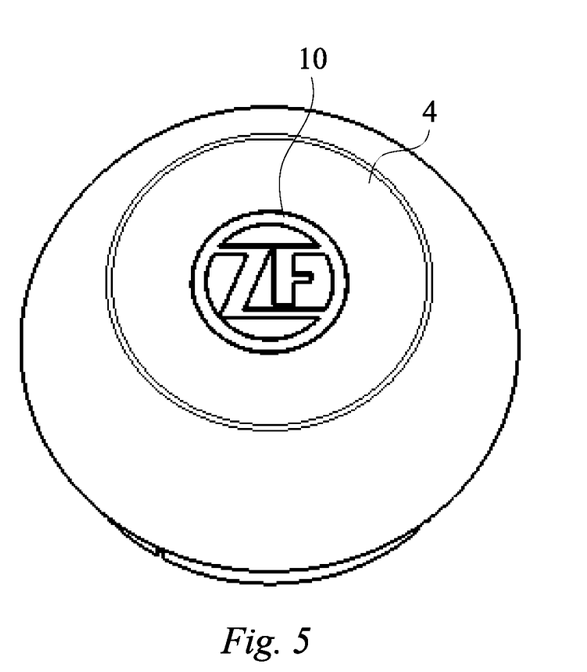
FIG. 5 is a structural schematic diagram of an airbag cover mounted with the luminous logo in the embodiment of the present invention.
Figure 6:
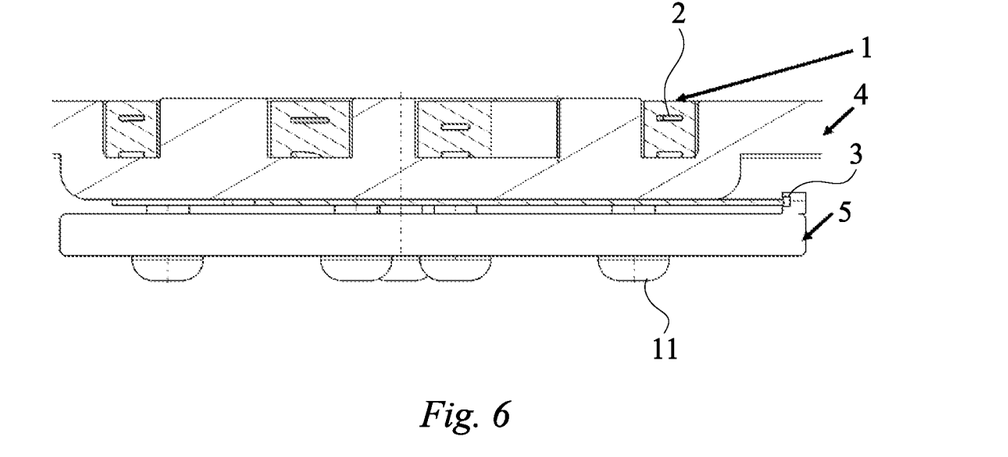
FIG. 6 is a cross-sectional structural schematic diagram of the airbag cover mounted with the luminous logo in the embodiment of the present invention.

FIG. 5 shows a structure of the airbag cover mounted with the luminous logo in the embodiment, and FIG. 6 shows a cross-sectional structure of the airbag cover mounted with the luminous logo. As shown in FIGS. 5 and 6, when the luminous logo 10 is applied to the airbag cover 4, the airbag cover 4 is provided with through holes (not specifically marked in the figures) allowing the protruding portions 11 to be assembled, the logo body 1 is assembled to the outer surface of the airbag cover 4, and the protruding portions 11 are inserted into the through holes. By assembling the logo body 1 to the airbag cover 4 from the above of the airbag cover 4, it is possible that the airbag cover 4 only needs to be provided with the through holes allowing the protruding portions 11 to be assembled, without the need for providing a large hole matching the outer contour of the logo body 1, thereby having little influence on the surface strength of the airbag cover 4.

Figure 7:
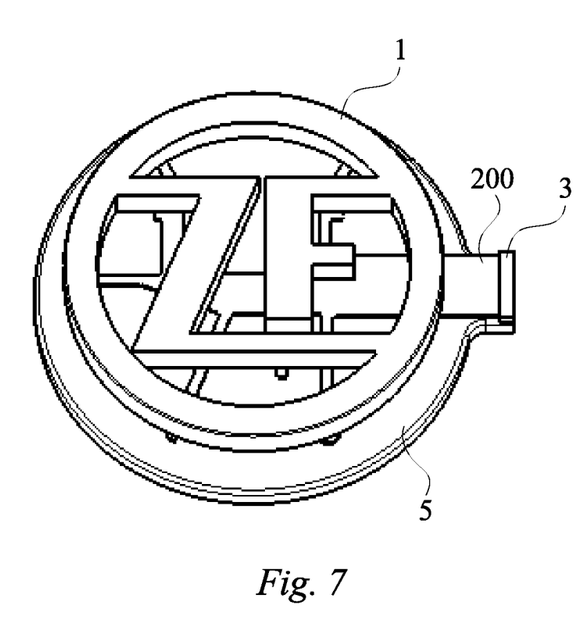
FIG. 7 is an assembly structural schematic diagram of the luminous logo and a mounting plate in the embodiment of the present invention.

Further, the logo body 1 is assembled to the airbag cover 4 by cooperating with the mounting plate. FIG. 7 shows an assembly structure of the luminous logo and the mounting plate in the embodiment. As shown in FIGS. 6 and 7, the mounting plate 5 is provided on an inner side of the airbag cover 4, the mounting plate 5 preferably matches the logo body 1 in shape, the mounting plate 5 is provided with fixing holes (not specifically marked in the figures) corresponding to the through holes, and the protruding portions 11 are inserted into the through holes and then fixed to the fixing holes, thereby realizing stable assembly to the airbag cover 4.

After the logo body 1 is mounted on the airbag cover 4, optical fibre tips are gathered together and connected to the light-emitting light source 3. In this embodiment, the light-emitting light source 3 may be assembled on the mounting plate 5, and the extended ends of the plurality of optical fibre bundles 2 are gathered to an optical fibre bundle tip 200 and connected to the light-emitting light source 3.

When the luminous logo 10 needs to be lit, the light-emitting light source 3 emits light, the optical fibre bundle tip 200 fixed in front of the light-emitting light source 3 may receive light. Due to the characteristics of the optical fibres, the light will fill the optical fibres. Moreover, since the optical fibres are of a side-emitting type, the light leaks out from a side wall of each optical fibre bundle 2, and after the light is homogenized by means of the logo body 1, uniform luminescence of the logo may be seen from the outside of the luminous logo 10.

The light-emitting light source 3 is not limited to be arranged at the mounting plate 5. As an example, in one embodiment, the light-emitting light source 3 may be assembled to an inner surface of the airbag cover 4, and the extended ends of the plurality of optical fibre bundles 2 are gathered together and connected to the light-emitting light source 3. As another example, in one embodiment, the light-emitting light source 3 is assembled outside the airbag cover 4, and the extended ends of the plurality of optical fibre bundles 2 are gathered together and connected to the light-emitting light source 3 by means of a main light-conducting optical fibre.

Figure 8:
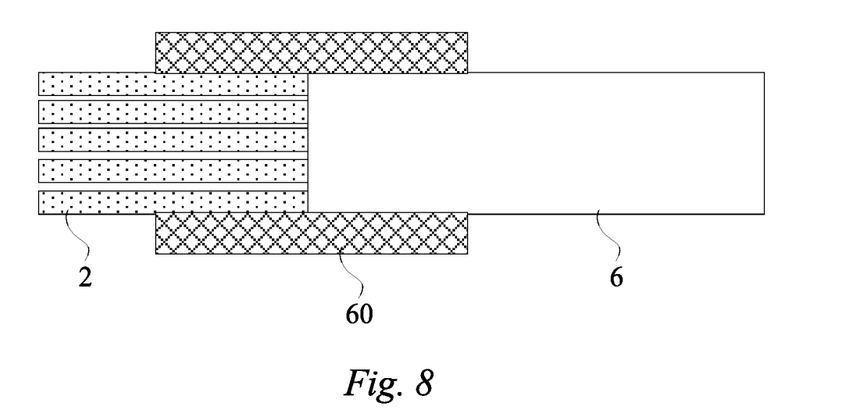
FIG. 8 is a schematic diagram of the principle of conducting light by optical fibres when a light-emitting light source is provided outside the airbag cover in the embodiment of the present invention.

FIG. 8 shows the principle of conducting the light by the optical fibres when the light-emitting light source is arranged outside the airbag cover in the embodiment. As shown in FIG. 8, when the light-emitting light source is mounted outside the airbag cover, the light may be conducted to the tip of each optical fibre bundle 2 by means of the main light-conducting optical fibre 6, and then the luminescence of the logo can be realized by means of each optical fibre bundle 2. The main light-conducting optical fibre 6 and the tips of the optical fibre bundles 2 may be connected by means of a connector 60.

Through the description of the above embodiments, when the luminous logo of the present invention is applied to the airbag cover, it is possible to assemble the logo body, which is a part that is lighter in weight but larger in area, from the front of the airbag cover, which has no influence on the inflation characteristics of an airbag; and the light-emitting light source is mounted on the back of the airbag cover or may be moved out of the airbag.

Figure 9:
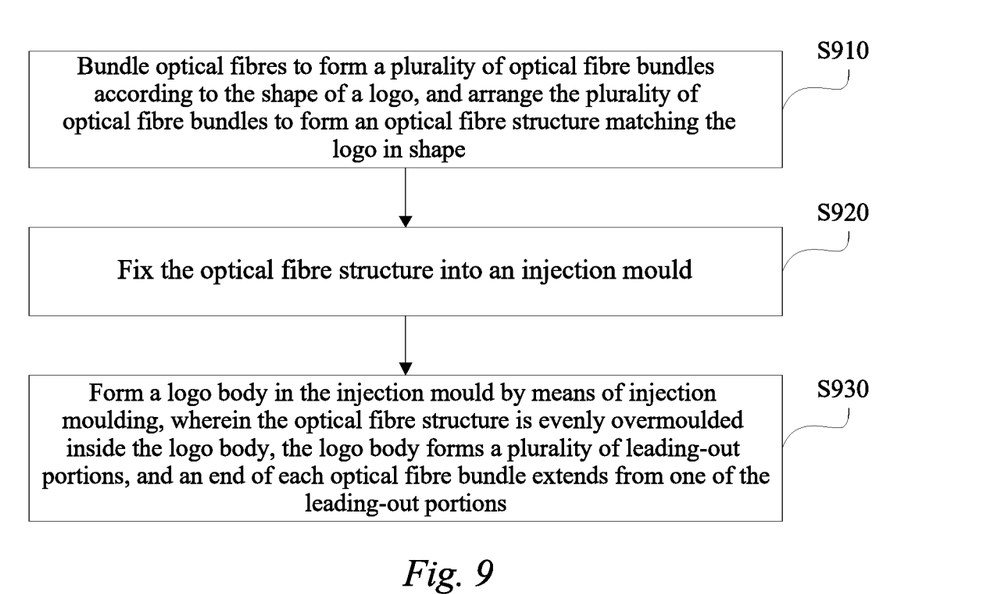
FIG. 9 is a schematic diagram of steps of a manufacturing method for a luminous logo in an embodiment of the present invention.

An embodiment of the present invention further provides a manufacturing method for a luminous logo, which is suitable for the luminous logo described in the above embodiments. FIG. 9 shows main steps of the manufacturing method for a luminous logo in the embodiment. As shown in FIG. 9, the manufacturing method for a luminous logo in this embodiment comprises: in 5910, bundling optical fibres to form a plurality of optical fibre bundles according to the shape of the logo, and arranging the plurality of optical fibre bundles to form an optical fibre structure matching the logo in shape; in 5920, fixing the optical fibre structure into an injection mould; and in 5930, forming a logo body in the injection mould by means of injection moulding, wherein the optical fibre structure is evenly overmoulded inside the logo body, the logo body forms a plurality of protruding portions, and an end of each optical fibre bundle extends from one of the protruding portions. Therefore, the logo body with optical fibres embedded therein is formed.

Further, after the logo body is formed, the manufacturing method further comprises: forming an airbag cover provided with through holes allowing the protruding portions to be assembled; and assembling the logo body from an outer surface of the airbag cover such that the luminous logo is fixed to the outer surface of the airbag cover, and the protruding portions are inserted into the through holes. In this way, the logo body is assembled to the airbag cover. By means of assembling the logo body from the outer surface of the airbag cover, the airbag cover only needs to be provided with the through holes allowing the protruding portions to be assembled, without the need for providing a large hole matching an outer contour of the logo body, thereby ensuring the surface strength of the airbag cover.

Certainly, the luminous logo may also be used for another automobile component, and the logo body may be assembled to the corresponding automobile component in a similar mode that has no influence on the surface strength of the automobile component.

The logo body may be specifically assembled to the airbag cover by means of a mounting plate. The mounting plate is arranged on an inner side of the airbag cover, wherein the mounting plate preferably matches the logo body in shape, and the mounting plate is provided with fixing holes corresponding to the through holes; and the logo body is assembled from the outer surface of the airbag cover, such that the protruding portions are inserted into the through hole and then fixed to the fixing holes, thereby realizing a stable assembly between the logo body and the airbag cover.

Further, when the logo body is assembled, the manufacturing method further comprises: assembling a light-emitting light source on the mounting plate, and gathering the extended ends of the plurality of optical fibre bundles together and connecting same to the light-emitting light source; or assembling a light-emitting light source to an inner surface of the airbag cover, and gathering the extended ends of the plurality of optical fibre bundles together and connecting same to the light-emitting light source; or assembling a light-emitting light source outside the airbag cover, and gathering the extended ends of the optical fibre bundles together and connecting same to the light-emitting light source by means of a main light-conducting optical fibre. That is to say, the light-emitting light source may be arranged at any suitable position as required, and when the logo body is assembled, optical fibre tips are gathered and connected to the light-emitting light source, so as to form the luminous logo.

According to the manufacturing method for a luminous logo in the above embodiment, the logo body is assembled from the front of the airbag cover, thereby ensuring the surface strength of the airbag cover and having no influence on the inflation characteristics of an airbag. The light-emitting light source may be mounted on the back of the airbag cover or may be moved out of the airbag by only gathering the optical fibre tips and connecting same to the light-emitting light source, without the need for binding the light-emitting light source with the logo body.

To sum up, in the luminous logo and the manufacturing method therefore provided by the present invention, the plurality of optical fibre bundles are arranged to form the optical fibre structure matching the logo body in shape, such that the optical fibre structure is evenly overmoulded inside the logo body, and optical fibres are embedded into the logo body. The ends of the optical fibre bundles extend from the protruding portions of the logo body and are gathered and connected to the detachable light-emitting light source to realize uniform luminescence of the logo body. Further, the detachable design of the light-emitting light source relative to the logo body can facilitate the assembly of the luminous logo; when the luminous logo is applied to an automobile component including but not limited to an airbag cover, the logo body and the light-emitting light source may be assembled separately, so that the automobile component does not need to be provided with a large hole matching an outer contour of the luminous logo, thereby ensuring the strength of the automobile component and the assembly stability of the luminous logo; and therefore, the structural design of the luminous logo of the present invention can well realize the luminescence of the logo while ensuring the assembly stability of the luminous logo.

The above is a further detailed description of the present invention with reference to the specific preferred embodiments, and it cannot be considered that the specific implementation of the present invention is limited to these descriptions. For those of ordinary skill in the art of the present invention, several simple deductions or substitutions can be made without departing from the spirit of the present invention, which should be regarded as falling within the scope of protection of the present invention.

The invention claimed is:

1. A manufacturing method for a luminous logo, comprising:
    bundling optical fibres to form a plurality of optical fibre bundles according to the shape of the logo, and arranging the plurality of optical fibre bundles to form an optical fibre structure matching the logo in shape;
    fixing the optical fibre structure into an injection mould; and
    forming a logo body in the injection mould by means of injection moulding, wherein the optical fibre structure is evenly overmoulded inside the logo body, the logo body forms a plurality of protruding portions, and an end of each optical fibre bundle extends from one of the protruding portions.

2. The manufacturing method according to claim 1, further comprising, after the logo body is formed:
    forming an airbag cover provided with through holes allowing the protruding portions to be assembled; and
    assembling the logo body from an outer surface of the airbag cover such that the logo body is fixed to the outer surface of the airbag cover, and the protruding portions are inserted into the through holes.

3. The manufacturing method according to claim 2, further comprising, when the logo body is assembled:
    providing a mounting plate on an inner side of the airbag cover, wherein the mounting plate is provided with fixing holes corresponding to the through holes; and
    inserting the protruding portions into the through holes and the fixing holes, then fixing the protruding portions to the mounting plate.

4. The manufacturing method according to claim 3, further comprising, when the logo body is assembled:
    assembling a light-emitting light source on the mounting plate, and gathering the extended ends of the plurality of optical fibre bundles together and connecting same to the light-emitting light source; or
    assembling a light-emitting light source to an inner surface of the airbag cover, and gathering the extended ends of the plurality of optical fibre bundles together and connecting same to the light-emitting light source; or
    assembling a light-emitting light source outside the airbag cover, and gathering the extended ends of the optical fibre bundles together and connecting same to the light-emitting light source by means of a main light-conducting optical fibre.

* * * * *